United States Patent
Gan et al.

(10) Patent No.: US 11,582,008 B2
(45) Date of Patent: **\*Feb. 14, 2023**

(54) DOWNLINK PPDU SENDING METHOD AND APPARATUS, AND DOWNLINK PPDU RECEIVING METHOD AND APPARATUS

(71) Applicant: HUAWEI TECHNOLOGIES CO., LTD., Guangdong (CN)

(72) Inventors: Ming Gan, Shenzhen (CN); Shimon Shilo, Hod Hasharon (IL); Leonid Epstein, Hod Hasharon (IL); Oded Redlich, Hod Hasharon (IL); Xun Yang, Shenzhen (CN); Tao Wu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/696,427

(22) Filed: Mar. 16, 2022

(65) Prior Publication Data

US 2022/0278789 A1    Sep. 1, 2022

Related U.S. Application Data

(63) Continuation of application No. 16/811,616, filed on Mar. 6, 2020, now Pat. No. 11,310,087, which is a (Continued)

(30) Foreign Application Priority Data

Nov. 3, 2017    (CN) .......................... 201711071408.8

(51) Int. Cl.
*H04K 1/10*    (2006.01)
*H04L 5/00*    (2006.01)
*H04L 27/26*    (2006.01)

(52) U.S. Cl.
CPC .......... *H04L 5/0053* (2013.01); *H04L 5/0007* (2013.01); *H04L 5/0044* (2013.01); *H04L 27/2603* (2021.01)

(58) Field of Classification Search
CPC .......................... H04L 27/2608; H04L 5/0007
(Continued)

(56) References Cited

U.S. PATENT DOCUMENTS 9,398,571 B2    7/2016    Kwon
2016/0100396 A1    4/2016    Seok
(Continued)

FOREIGN PATENT DOCUMENTS

CN    106535334    3/2017
CN    106658722    5/2017
(Continued)

OTHER PUBLICATIONS

Extended European Search Report issued in European Application No. 18871938.9 dated Oct. 16, 2020, 10 pages.
(Continued)

*Primary Examiner* — Zewdu A Kassa
(74) *Attorney, Agent, or Firm* — Fish & Richardson P.C.

(57) ABSTRACT

A radio physical layer protocol data unit (PPDU) sending method includes: obtaining, a radio physical layer protocol data unit (PPDU), wherein the PPDU includes a high efficiency-signal field A (HE-SIG-A) and a high efficiency-signal field B (HE-SIG-B), the HE-SIG-A includes a field indicating a quantity of orthogonal frequency division multiplexing (OFDM) symbols in the HE-SIG-B, and wherein a value of the field indicates one of the following: that the quantity of OFDM symbols included in the HE-SIG-B is greater than or equal to 16, or the quantity of OFDM symbols included in the HE-SIG-B; and sending the PPDU.

24 Claims, 4 Drawing Sheets

STA1 - HT
High throughput station 1

AP1 - HT
High throughput access point 1

Related U.S. Application Data continuation of application No. PCT/CN2018/112869, filed on Oct. 31, 2018.

(58) Field of Classification Search
USPC .................. 375/260, 259, 219, 316, 295
See application file for complete search history.

(56) References Cited

U.S. PATENT DOCUMENTS

| | | | |
|---|---|---|---|
| 2016/0150514 | A1 | 5/2016 | Kwon et al. |
| 2016/0156438 | A1 | 6/2016 | Sun et al. |
| 2016/0360443 | A1 | 12/2016 | Hedayat |
| 2017/0181129 | A1 | 6/2017 | Bharadwaj et al. |
| 2017/0201357 | A1 | 7/2017 | Choi et al. |
| 2017/0250848 | A1 | 8/2017 | Lee et al. |
| 2017/0303280 | A1 | 10/2017 | Chun et al. |
| 2017/0373901 | A1 | 12/2017 | Lim et al. |
| 2018/0367242 | A1* | 12/2018 | Elsherif .............. H04L 1/001 |
| 2019/0364525 | A1 | 11/2019 | Yu et al. |

FOREIGN PATENT DOCUMENTS

| | | |
|---|---|---|
| CN | 106664165 | 5/2017 |
| CN | 107210989 | 9/2017 |
| WO | 2016197349 | 12/2016 |

OTHER PUBLICATIONS

Fang, "The Implementation and Simulation of Frame Aggregation Mechanisms and Noise Variance Estimation Algorithm Based on WLAN Link Simulation Platform," Southwest Jiaotong University, 2014, Issue 9, 2 pages (with English abstract).

HTC, "UE radio access capability for WLAN," 3GPP TSG-RAN2#91bis meeting, R2-154369, Malmo, Sweden, Oct. 5-9, 2015, 7 pages.

IEEE P802.11ax™/D2.0, Part 11: Wireless LAN Medium Access Control (MAC) and Physical Layer (PHY) Specifications Amendment 6: Enhancements for High Efficiency WLAN, Oct. 2017, 596 pages.

Khan et al., "On the Field Level Loss of a VHT PPDU in a MIMO-OFDM System for a WiFi Direct 802.11ac WLAN," 2016 International Conference on Frontiers of Information Technology (FIT), Dec. 2016, 6 pages.

Office Action issued in Chinese Application No. 201711071408.8 dated Feb. 3, 2021, 6 pages.

Office Action issued in Chinese Application No. 201711071408.8 dated Sep. 1, 2021, 7 pages (with English translation).

Office Action issued in Japanese Application No. 2020-520529 dated Jun. 29, 2021, 6 pages (with English translation).

PCT International Search Report and Written Opinion in International Application No. PCT/CN2018/112869, dated Dec. 26, 2018, 17 pages (with English Translation).

* cited by examiner

| Legacy-short training field L-STF | Legacy-long training field L-LTF | Legacy-signal field L-SIG | Repeated Legacy-signal field RL-SIG | High efficiency-signal field A HE-SIG-A | High efficiency-signal field B HE-SIG-B | High efficiency-short training field HE-STF | High efficiency-long training field HE-LTF | Data Data |

FIG. 3

DOWNLINK PPDU SENDING METHOD AND APPARATUS, AND DOWNLINK PPDU RECEIVING METHOD AND APPARATUS

CROSS-REFERENCE TO RELATED APPLICATIONS

This application is a continuation of U.S. patent application Ser. No. 16/811,616, filed on Mar. 6, 2020, which is a continuation of International Application No. PCT/CN2018/112869, filed on Oct. 31, 2018. The International Application claims priority to Chinese Patent Application No. 201711071408.8, filed on Nov. 3, 2017. All of the aforementioned patent applications are hereby incorporated by reference in their entireties.

TECHNICAL FIELD

The present invention relates to the field of communications technologies, and more specifically, to a downlink PPDU sending method and apparatus, and a downlink PPDU receiving method and apparatus.

BACKGROUND

To significantly increase a service transmission rate in a WLAN system, in the institute of electrical and electronics engineers (IEEE) 802.11ax standard, an orthogonal frequency division multiple access (OFDMA) technology is further used based on an existing orthogonal frequency division multiplexing (OFDM) technology. A time-frequency resource of a wireless channel on an air interface is divided into a plurality of orthogonal time-frequency resource unit (RU) in the OFDMA technology. The RUs may be shared in time domain and be orthogonal in frequency domain.

The OFDMA technology supports a plurality of nodes in simultaneously sending and receiving data. When an access point needs to transmit data with a station, resources are allocated based on an RU or RU group. Different channel resources are allocated to different STAs at a same moment, so that a plurality of STAs efficiently access channels, thereby increasing channel utilization.

In an existing Wi-Fi system including an IEEE 802.11a-based legacy system and an IEEE 802.11n-based HT system, uplink data transmission is only point-to-point transmission, as shown in FIG. 1. To be specific, at a same moment, on a same channel, or in a same spectrum segment, only one STA transmits data to the AP. Downlink data transmission is also point-to-point transmission. To be specific, at a same moment or in a same spectrum segment, the AP transmits data to only one STA. However, in a next-generation Wi-Fi system, or in a HEW system, after the OFDMA technology is introduced, uplink data transmission is no longer point-to-point transmission, but multipoint-to-point transmission, as shown in FIG. 2. To be specific, at a same moment, on a same channel, or in a same spectrum segment, a plurality of STAs simultaneously transmit data to the AP. Downlink data transmission is also no longer a point-to-point transmission, but point-to-multipoint transmission.

For an OFDMA-based WLAN system, a time-frequency resource needs to be efficiently indicated to the STA.

SUMMARY

Embodiments of the present invention provide a downlink PPDU sending method and apparatus and a downlink PPDU receiving method and apparatus, to support reduction of transmission resource overheads caused by resource scheduling.

An embodiment of the present invention provides a plurality of solutions used to resolve the foregoing technical problem. A radio physical layer protocol data unit PPDU sending method includes: obtaining, by a sending apparatus, a radio physical layer protocol data unit PPDU, where the PPDU includes a high efficiency-signal field A and a high efficiency-signal field B HE-SIG-B, the HE-SIG-A includes a field used to indicate a quantity of OFDM symbols in the HE-SIG-B, and when different MCSs are used, or whether DCM is used, or different bandwidths are used for HE-SIG-B field transmission, a same value in the field used to indicate the quantity of OFDM symbols in the HE-SIG-B indicates different quantities of OFDM symbols; and sending the PPDU, so that a receiving apparatus determines, with reference to the different MCSs, or whether the DCM is used, or the different bandwidths and based on a value of the field used to indicate the quantity of OFDM symbols in the HE-SIG-B, the quantity of OFDM symbols in the HE-SIG-B.

Correspondingly, an embodiment of the present invention further provides an apparatus that may be configured to perform the foregoing method, and a method and an apparatus on a receiver side. Details are not described herein again. An embodiment of the present invention also provides a corresponding computer readable storage medium, configured to implement one of methods mentioned in all implementations.

According to the PPDU sending method and apparatus in the embodiments of the present invention, OFDMA transmission in a WLAN system can be properly and efficiently completed.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may derive other drawings from these accompanying drawings without creative efforts.

FIG. 3 is a simple schematic structural diagram of a downlink multi-station PPDU frame according to an embodiment of the present invention (compliant with 802.11ax);

DESCRIPTION OF EMBODIMENTS

Figure 1:
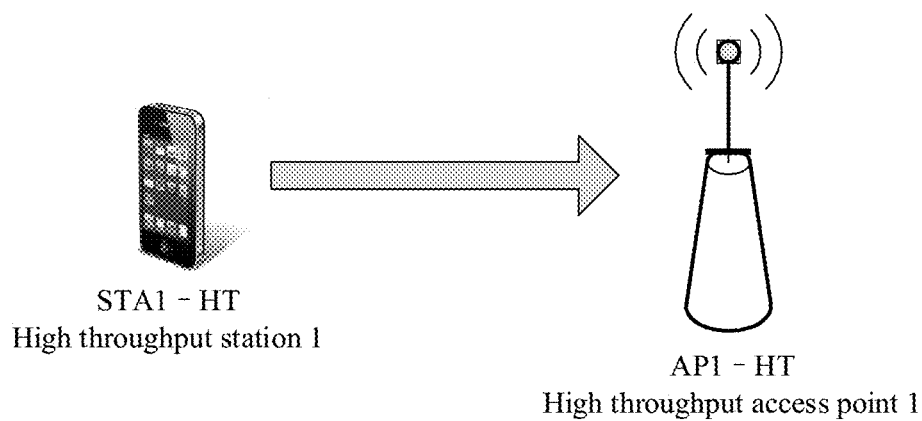
FIG. 1 is a simple schematic diagram of point-to-point transmission in a WLAN system.
Figure 2:
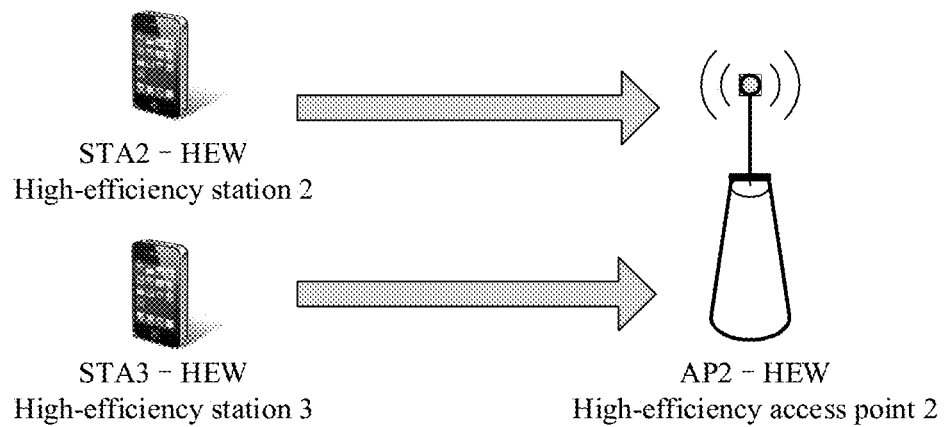
FIG. 2 shows multipoint-to-point transmission in another WLAN system (for example, a HEW)

The following clearly describes technical solutions in embodiments of the present invention with reference to accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Acronyms and Abbreviations

| English abbreviation | Complete English expression/English standard term | Chinese expression/ Chinese term |
|---|---|---|
| AP | Access point | Access point |
| STA | Station | Station |
| OFDM | Orthogonal frequency division multiplexing | Orthogonal frequency division multiplexing |
| OFDMA | Orthogonal frequency division multiple access | Orthogonal frequency division multiple access |
| FD | Full duplex | Full duplex |
| WLAN | Wireless local access network | Wireless local access network |
| RU | Resource unit | Resource unit |
| DL | Downlink | Downlink |
| UL | Uplink | Uplink |
| TXOP | Transmit opportunity | Transmission opportunity |
| NG | Next generation | Next generation |
| MAC | Medium access control | Medium access control |
| MU | Multiple user | Multiple user |
| PPDU | PHY protocol data unit | PHY protocol data unit |
| VHT | Very high throughput | Very high throughput |
| L-STF | Legacy-short training field | Legacy-short training field |
| L-LTF | Legacy-long training field | Legacy-long training field |
| L-SIG | Legacy-signal field | Legacy-signal field |
| RL-SIG | Repeated legacy-signal field | Repeated legacy-signal field |
| HE-SIG-A | High efficient-signal field A | High efficiency-signal field A |
| HE-SIG-B | High efficient-signal field B | High efficiency-signal field B |
| HE-STF | High efficient-short training field | High efficiency-short training field |
| HE-LTF | High efficient-long training field | High efficiency-long training field |

A sending apparatus in each implementation, for example, may be an access point (AP) in a WLAN, and the AP may also be referred to as a wireless access point, a bridge, a hotspot, or the like, and may access a server or a communication network.

As a receiving apparatus, for example, the receiving apparatus may be a user station (STA) in the WLAN, and the STA may also be referred to as a user, and may be a wireless sensor, a wireless communications terminal, or a mobile terminal, for example, a mobile phone (or referred to as a "cellular" phone) and a computer having a wireless communication function. For example, the receiving apparatus may be a portable, pocket-sized, handheld, computer built-in, wearable, or vehicle-mounted wireless communications apparatus that exchanges communication data such as voice and/or data with a radio access network.

It should be understood that the foregoing enumerated system applicable to a method in the embodiments of the present invention is merely an example for description, and the present invention is not limited thereto. For example, the following may be further enumerated: a global system for mobile communications (GSM), a code division multiple access (CDMA) system, a wideband code division multiple access (WCDMA) system, a general packet radio service (GPRS System, a long term evolution (LTE) system.

Correspondingly, a network device may be an access point, and this is not limited in the present invention. A terminal device may be a mobile terminal, or mobile user equipment, for example, a mobile phone (or referred to as a "cellular" phone).

A downlink PPDU sent by the AP in each implementation of the present invention complies with the 802.11ax standard, and this can ensure compatibility with a transmission frame format in a conventional Wi-Fi system. As shown in FIG. 3, a frame format of the PPDU includes a legacy-preamble part Legacy-preamble, a high efficiency-signal field A (HE-SIG-A), a high efficiency-signal field B (HE-SIG-B), a high efficiency-short training field (HE-STF), a high efficiency-long training field (HE-LTF), and a data field. The legacy-preamble includes a legacy-short training field (L-STF), a legacy-long training field (L-LTF), and a legacy-signal field (L-SIG).

It should be noted that, based on an indication of a subfield included in the HE-SIG-A, a quantity of OFDM symbols included in the HE-SIG-B field is changeable, and fields preceding the HE-SIG-B field each include a fixed quantity of OFDM symbols. For example, the HE-SIG-A includes two quantities of OFDM symbols. The aforementioned subfield in the HE-SIG-A is used to indicate the quantity of OFDM symbols included in the HE-SIG-B field. A length of the subfield is fixed, and the subfield occupies four bits, for example, B18-B21.

In an embodiment of the present invention, transmission bandwidths include 20 M, 40 M, 80 M, 160 M, and four puncturing modes in the 80 M and 160 M bandwidths. Resource units that may be obtained through division of the 20 M bandwidth include a 26 resource unit, a 52 resource unit, a 106 resource unit, and a 242 resource unit, the foregoing several different resource units may be combined into the 20 M bandwidth, and the 20 M bandwidth may be divided into a maximum of nine 26 resource units (which includes 26 subcarriers, and is a smallest of all types of resource units). Resource units that may be obtained through division of the 40 M bandwidth include a 26 resource unit, a 52 resource unit, a 106 resource unit, a 242 resource unit, and a 484 resource unit, the foregoing several different resource units may be combined into the 40 M bandwidth, and the 40 M bandwidth may be divided into a maximum of eighteen 26 resource units. Resource units that may be obtained through division of the 80 M bandwidth include a 26 resource unit, a 52 resource unit, a 106 resource unit, a 242 resource unit, a 484 resource unit, and a 996 resource unit, and the foregoing several different resource units may be combined into the 80 M bandwidth, and the 80 M bandwidth may be divided into a maximum of thirty-seven 26 resource units. Resource units that may be obtained through division of the 160 M bandwidth include a 26 resource unit, a 52 resource unit, a 106 resource unit, a 242 resource unit, a 484 resource unit, a 996 resource unit, and a 996*2 resource unit, and the foregoing several different resource units may be combined into the 160 M bandwidth, and the 160 M bandwidth may be divided into a maximum of seventy-four 26 resource units. Specifically, reference may be made to the 802.11ax standard, and details are not described herein again.

In a transmission process, if a bandwidth is greater than the fundamental channel of 20 MHz, the legacy-preamble, an RL-SIG, and the HE-SIG-A are replicated and transmitted on each 20 MHz channel. However, the HE-SIG-B is transmitted on each 20 MHz channel in a [1 2 1 2] manner. Specifically, when the bandwidth is 20 M, the HE-SIG-B includes only one HE-SIG-B content channel, and the HE-SIG-B content channel is transmitted on the 20 M channel. When the bandwidth is greater than 20 M, the HE-SIG-B includes only two HE-SIG-B content channels, and each HE-SIG-B content channel includes a same quantity of OFDM symbols. One HE-SIG-B content channel is transmitted on an odd-numbered 20 M channel (HE-SIG-B 1 for short), and includes resource allocation information (located in a common field common field) of a plurality of odd-numbered 20 M channels and user fields (located in a user specific field user specific field) transmitted on the plurality of odd-numbered 20 M channels. The other HE-SIG-B content channel is transmitted on an even-numbered 20 M channel (HE-SIG-B2 for short), and includes resource allocation information of a plurality of even-numbered 20 M channels and user fields transmitted on the plurality of even-numbered 20 M channels. In addition, quantities of bits included in the two HE-SIG-B content channels need to be same, and if the quantity of bits included in one HE-SIG-B content channel is longer than the quantity of bits included in the other HE-SIG-B content channel, a short HE-SIG-B content channel needs to be padded with a bit for alignment.

Figure 4:
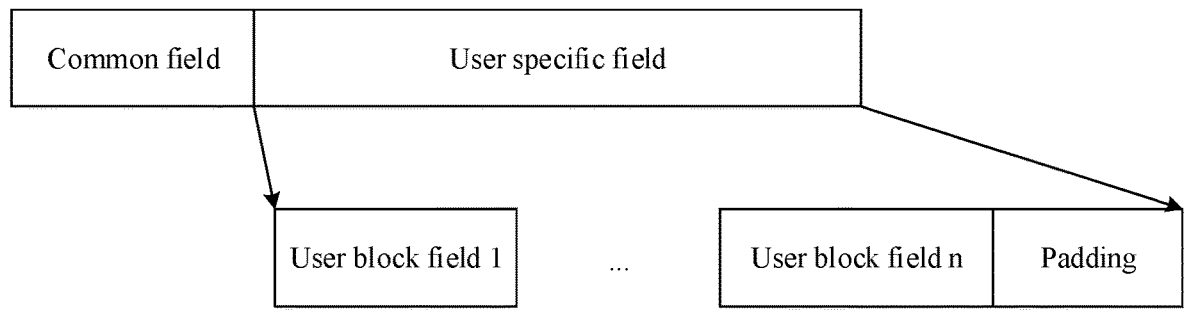
FIG. 4 is a schematic structural diagram of an HE-SIG-B content channel.

Referring to FIG. 4, an HE-SIG-B content channel includes a common field and a user specific field. The common field includes 8*N-bit resource allocation information of an odd-numbered or even-numbered 20 M channel (N is a quantity of the odd-numbered or even-numbered 20 M channels), a 1-bit indication indicating whether a 26 resource unit in 80 MHz or in 80 M of a 160 M bandwidth is used, a 4-bit cyclic redundancy check code field, and a 6-bit tail bit field. The user specific field further includes a user block field. In addition to the last user block field, each user block field further includes two user fields, a cyclic redundancy check code field, and a tail bit field. The last user block field may include one or two user fields, a 4-bit cyclic redundancy check code field, and a 6-bit tail bit field. The user field includes 21 bits. Therefore, the user specific field includes Z*21+ceil(Z/2)*10 bits, where Z is a quantity of stations included in the HE-SIG-B content channel (including a dummy station, where the dummy station is a station corresponding to another unused resource unit other than an unused resource unit indicated in the common field), and ceil( ) is rounding up.

Therefore, a quantity of bits included in the entire HE-SIG-B content channel is:

$$8*N+a+10+Z*21+ceil(Z/2)*10 \quad \text{Formula 1}$$

where when the bandwidth is 80 M or 160 M, a=1; otherwise, a=0.

The common field includes resource allocation information, and is used to indicate the RU assignment. The user field included in a user specific field is in a one-to-one correspondence with the several resource units obtained through division. For example, the bandwidth spectrum resource is divided into two resource units, and a user field included in the user specific field is a station 1 information field and a station 2 information field, and it means that data of a station 1 is transmitted on the first resource unit, and data of a station 2 is transmitted on the second resource unit.

If a plurality of stations are invoked in downlink OFDMA, it means that a quantity of information bits included in each HE-SIG-B content channel is excessive, and consequently, the quantity of OFDM symbols included in the HE-SIG-B field is excessive. Therefore, a large quantity of bits need to be spent in the HE-SIG-A field to indicate the quantity of OFDM symbols of the following HE-SIG-B field. However, a quantity of bits included in the HE-SIG-A is limited.

Specifically, an HE-SIG-A stipulated in the 802.11ax draft 2.0 version is used an example, and an HE-SIG-A field in a downlink multi-station PPDU frame in 802.1 lax is as follows:

| HE-SIG-A symbol | Bit | Field | Quantity of bits |
| --- | --- | --- | --- |
| HE-SIG-A 1 | B0 | Uplink/Downlink | 1 |
| | B1-B3 | HE-SIG-B modulation coding | 3 |
| | B4 | HE-SIG-B dual-carrier modulation | 1 |
| | B5-B10 | BSS (basic service set) color | 6 |
| | B11-B14 | Space division multiplexing | 4 |
| | B15-B17 | Bandwidth | 3 |
| | B18-B21 | HE-SIG-B symbol quantity or multi-user multiple-input multiple-output station quantity | 4 |
| | B22 | HE-SIG-B compression | 1 |
| | B23-B24 | Sideband interval + long training field size | 2 |
| | B25 | Doppler | 1 |
| HE-SIG-A 2 | B0-B6 | Transmission opportunity | 7 |
| | B7 | Reservation | 1 |
| | B8-B10 | HE-LTF quantity and midamble period | 3 |
| | B11 | Low-density parity-check code extra symbol | 1 |
| | B12 | Space division time coding | 1 |
| | B13-B14 | Padding factor before forward error correction coding | 2 |
| | B15 | Fuzziness of padding and expansion | 1 |
| | B16-B19 | Cyclic redundancy check code | 4 |
| | B20-B25 | Tail bit | 6 |

In the HE-SIG-A 1 in the existing 802.11ax draft 2.0 version, when a value of a B22 is 0, a value of the B18-B21 is a quantity of symbols in the HE-SIG-B minus 1; and when the value of B22 is 1, the value of the B18-B21 is a quantity of stations participating in multi-user multiple-input multiple-output transmission minus 1. To be specific, four bits are used by the HE-SIG-A to indicate the quantity of symbols in the HE-SIG-B, and a maximum of 16 OFDM symbols can be indicated.

However, the foregoing technical solution has the following problems:

Through calculation, when an MCS0 and dual-carrier modulation are used for the HE-SIG-B, 16 OFDM symbols can carry 208-bit data, when the MCS0, or an MCS1 and the dual-carrier modulation are used for the HE-SIG-B, 16 OFDM symbols include 416-bit data; and when the MCS1, or an MCS2 and the dual-carrier modulation are used for the HE-SIG-B, 16 OFDM symbols include 832-bit data. The foregoing bit data does not include a pilot bit.

When the bandwidth is 160 M, four odd-numbered 20 M channels and four even-numbered 20 M channels are included. Based on Formula 1, if the MCS0 and the dual-carrier modulation are used for the HE-SIG-B, $$8*N+a+10+ceil(X)*21+ceil(ceil(X)*/2)*10<=208 \quad \text{Formula 2}$$

Herein, N=4, a=1, and X is a total quantity of user fields included in the HE-SIG-Bin the PPDU of the 160 M bandwidth. It should be noted that X is based on that user field two HE-SIG-B content channels each include a same quantity of user fields. If the quantities of user fields included in the two HE-SIG-B content channels are different, a short HE-SIG-B content channel needs to be padded with a garbage bit to align with a long HE-SIG-B content channel in length. Therefore, an actual quantity of user fields included in the HE-SIG-B is less than X. X<=12 is obtained through calculation. Therefore, if the MCS0 and the dual-carrier modulation are used for the HE-SIG-B, a maximum quantity of stations that can be scheduled in the 160 M bandwidth cannot exceed 12.

However, 160 M, 80 M, and 40 M bandwidths can be divided into a maximum of 74, 32, and 18 resource units, and a type of each resource unit is a minimum 26 resource unit. In other words, 74, 32, and 18 stations are allowed to be scheduled. However, a maximum quantity of stations scheduled in downlink OFDMA is 12 due to an upper limit of a quantity of symbols in the existing HE-SIG-B, thereby reducing a multi-user diversity gain caused by an OFDMA technology. It should be noted that, because the 20 M bandwidth can be divided into a maximum of 9 resource units, and therefore, the 20 M bandwidth is not limited by the upper limit of the quantity of symbols in the existing HE-SIG-B.

Embodiment 1

As mentioned in the foregoing technical solution, the HE-SIG-B symbol quantity field B18-B21 in the existing HE-SIG-A 1 field can indicate a maximum of 16 OFDM symbols included in the HE-SIG-B. As a result, a maximum of 12 stations can be scheduled in the 80 M or 160 M bandwidth. If excessive stations are scheduled in the downlink OFDMA, and consequently, the quantity of symbols in the HE-SIG-B is greater than 16. However, in this case, a receiver still performs execution according to an indication of the HE-SIG-B symbol quantity field in the HE-SIG-A 1 field. As a result, the receiver misdetermines an end bit (end position) of the HE-SIG-B, and incorrectly receives a data packet.

To avoid the foregoing problem, an implementation of the present invention is provided, and includes the following steps.

On a transmitter side:

101. A sending apparatus obtains a radio physical layer protocol data unit PPDU, where the PPDU includes a high efficiency-signal field A HE-SIG-A and a high efficiency-signal field B HE-SIG-B; and the HE-SIG-A includes a field (for example, a field B18-B21) used to indicate a quantity of OFDM symbols in the HE-SIG-B.

For a field (for example, the field B18-B21) used to indicate a quantity of OFDM symbols in the HE-SIG-B in the HE-SIG-A field, when a value of the field is a specific value (for example, when the B18-B21 in the HE-SIG-A is 15, in other words, "1111"), the value is used to indicate that the quantity of OFDM symbols included in the HE-SIG-B is greater than or equal to 16; and when a value of the field is another value, the value is used to indicate the quantity of OFDM symbols included in the HE-SIG-B. For example, when the B18-B21 in the HE-SIG-A is any one of 0 to 14, the quantity of OFDM symbols included in the HE-SIG-B is equal to the value of the field B18-B21+1.

102. Send the PPDU, so that a receiving apparatus determines, based on at least the field that is included in the HE-SIG-A and that is used to indicate the quantity of OFDM symbols in the HE-SIG-B, an end position of the HE-SIG-B.

On a receiver side, the method includes the following steps.

103. Receive a radio physical layer protocol data unit PPDU, where the PPDU includes a high efficiency-signal field A HE-SIG-A and a high efficiency-signal field B HE-SIG-B, and the HE-SIG-A includes a field (for example, a field B18-B21) used to indicate a quantity of OFDM symbols in the HE-SIG-B.

Specifically, the HE-SIG-A may further include one or a combination of the following information: an MCS used for the HE-SIG-B, whether DCM is used for the HE-SIG-B, or a current bandwidth for the HE-SIG-B.

104. A receiving apparatus determines, based on the received HE-SIG-A, the quantity of OFDM symbols in the HE-SIG-B (or an end position of the HE-SIG-B field).

Specifically, based on the received HE-SIG-A field, if a value of an HE-SIG-B symbol quantity field (namely, the B18-B21) is 0 to 14, a quantity M of OFDM symbols of the following HE-SIG-B field is directly determined. Specifically, M is the value of the HE-SIG-B symbol quantity field (namely, the B18-B21) in the HE-SIG-A field+1. If the value of the HE-SIG-B symbol quantity field (namely, the B18-B21) is 15, station quantity information is obtained by reading a common field in the HE-SIG-B, to infer, based on the station quantity information, the quantity of OFDM symbols included in the HE-SIG-B.

In an example, the foregoing inference method includes: The HE-SIG-B field includes two HE-SIG-B content channels, namely, the HE-SIG-B 1 and the HE-SIG-B2 described above. In this case, the quantity of OFDM symbols in the HE-SIG-B field depends on an HE-SIG-B content channel that includes a larger quantity of user fields. Therefore, the receiving apparatus needs to read common fields separately included in each of the two HE-SIG-B content channels, and accumulate, based on 8-bit resource allocation information of every 20 M channel included in the two common fields, a quantity of stations on each divided resource unit, thereby obtaining the user field included in each HE-SIG-B content channel (including another unused resource unit other than an unused resource unit indicated by the common field, and in this case, the quantity of user fields is 1).

Based on the HE-SIG-B content channel that includes the maximum of user fields (the other HE-SIG-B content channel is padded to align with the HE-SIG-B content channel in length), a quantity of bits of the HE-SIG-B content channel is obtained based on Formula 1, and then a quantity of bits included in each OFDM symbol is obtained based on the MCS used by the HE-SIG-B and whether the DCM is used, thereby obtaining a quantity of OFDM symbols included in the HE-SIG-B content channel. Finally, the quantity of symbols included in the HE-SIG-B field is obtained.

For ease of understanding, an example is used to describe the foregoing solution. A downlink OFDMAPPDU of a channel of an 80 M bandwidth is used an example, the 80 M channel sequentially includes a first channel, a second channel, a third channel, and a fourth channel that each are of 20 M bandwidth. In a table of resource allocation information of the common field in the HE-SIG-B based on the 802.11ax draft 2.0, the common field in each HE-SIG-B content channel includes: two resource allocation sequences, where the resource allocation sequence is specific for each 20 M channel, and a length of each resource allocation sequence is eight bits; a 1-bit indication indicating whether a 26 resource unit in 80 M is used; a 4-bit cyclic redundancy check code; and a 6-bit tail bit. Because the resource allocation sequence and the indication indicating whether the 26 resource unit in the 80 M is used are related to a quantity of station information included in each HE-SIG-B content channel, it is assumed that only the two factors are considered below. Assuming that the MCS0 and the DCM are used for HE-SIG-B transmission, and when resource allocation sequences of the HE-SIG-B content channel 1 (HE-SIG-B 1 for short) are "00000000", "11001001", and "0", meaning indicated by the three sequences is as follows: the first sequence indicates that the first 20 M channel is divided into nine 26 resource units, and each 26 resource unit is transmitted by only one station; the second sequence indicates that the third 20 M channel and the fourth 20 M channel are combined into a 484 resource unit, and in stations transmitting the 484 resource unit, information fields of two stations are included in the HE-SIG-B 1; and the third sequence indicates that the 26 resource unit in the 80 M bandwidth is not used, but there is no corresponding dummy user field; and when resource allocation sequences of the HE-SIG-B content channel 2 (HE-SIG-B2 for short) are "00000001", "11001101", and "0", meaning indicated by the three sequences is as follows: the first sequence indicates that the second 20 M channel is divided into seven 26 resource units and one 52 resource unit, and each of the 26 resource unit and 52 resource unit is transmitted by only one station; the second sequence is corresponding to the fourth 20 M channel, and indicates that the third 20 M channel and the fourth 20 M channel are combined into a 484 resource unit, and in stations transmitting the 484 resource unit, information fields of six stations are included in the HE-SIG-B2; and the third sequence indicates that the 26 resource unit in the 80 M bandwidth is not used, but there is no corresponding dummy user field.

The meaning indicated by the foregoing sequence indications is based on the 802.11ax draft 2.0.

The foregoing two HE-SIG-B content channels are received and correctly decoded, to learn that the quantity of user fields included in the HE-SIG-B content channel 1 is 11, and the quantity of user fields included in the HE-SIG-B content channel 2 is 14. Therefore, a station calculates a quantity of OFDM symbols in the HE-SIG-B by using 14 (a larger one of the two) user fields, and based on Formula 1, a quantity of information bits included in the HE-SIG-B is 391 bits, where N=2, Z=14, and a=1. Each OFDM symbol in the HE-SIG-B for which the MCS0 and the DCM are used includes 13 bits, so that the receiver may learn that 31 OFDM symbols are required for the HE-SIG-B.

Embodiment 2

In another alternative implementation, a problem that a field in the HE-SIG-A cannot indicate a quantity of all OFDM symbols in the HE-SIG-B may also be resolved.

In this implementation, fields and functions of the HE-SIG-A and the HE-SIG-B are the same as those described above. To avoid a conflict that the quantity of symbols in the HE-SIG-B exceeds the maximum quantity 16 indicated by the HE-SIG-B symbol quantity field B18-B21 in the HE-SIG-A 1 field due to excessive stations scheduled in the downlink OFDMA, the maximum quantity of stations scheduled in the downlink OFDMA may be limited.

For example, for the 160 M or 80 M bandwidth, a lowest rate, and the MCS0 and the DCM are used for the HE-SIG-B transmission. To be specific, the HE-SIG-B is allowed to include 16*13=208 bits. Based on Formula 1, in the 160 M or 80 M bandwidth, a maximum quantity of stations that are allowed to be invoked is X.

$$8*N+a+10+\text{ceil}(X/2)*21+\text{ceil}(\text{ceil}(X/2)/2)*10<=208 \quad \text{Formula 3}$$

where N=4 or N=2, a=1, and X=12 is obtained through calculation.

For another example, for the 40 M bandwidth, a lowest rate, and the MCS0 and the DCM are used for the HE-SIG-B transmission. To be specific, the HE-SIG-B is allowed to include 16*13=208 bits. Based on Formula 1, in the 40 M bandwidth, a maximum quantity of stations that are allowed to be invoked is X.

$$8*N+a+10+\text{ceil}(X/2)*21+\text{ceil}(\text{ceil}(X/2)/2)*10<=208 \quad \text{Formula 3}$$

where N=1 and a=0, and X=14 is obtained through calculation.

It should be noted that X is based on that two HE-SIG-B content channels each include a same quantity of user fields. If the quantities of user fields included in the two HE-SIG-B content channels are different, a short HE-SIG-B content channel needs to be padded with a garbage bit to align with a long HE-SIG-B content channel in length. Therefore, an actual quantity of user fields included in the HE-SIG-B is less than X.

Considering that the DCM is optional in the 802.11ax, when the DCM is not supported, the lowest transmission rate of the HE-SIG-B is the MCS0. To be specific, the HE-SIG-B is allowed to include 16*26=416 bits. Based on the foregoing same calculation, in the 160 M or 80 M bandwidth, a maximum quantity of stations that are allowed to be invoked is 28. A maximum quantity of stations that are allowed to be scheduled in the 40 M bandwidth or a 20 M bandwidth is greater than a quantity of resource units that may be obtained by dividing the bandwidth. Therefore, the maximum quantity of stations that are allowed to be scheduled does not need to be limited.

In conclusion, the following solution may be used to avoid a problem that the quantity of OFDM symbols in the HE-SIG-B exceeds the maximum quantity (to be specific, 16) indicated by the HE-SIG-B symbol quantity field (namely, the B18-B21) in the HE-SIG-A 1 field due to excessive stations scheduled in the downlink OFDMA.

When the DCM is used for the HE-SIG-B, for the 160 M or 80 M bandwidth, the maximum quantity of stations that are allowed to be invoked is 12, and for the 40 M bandwidth, the maximum quantity of stations that are allowed to be invoked is 14. Alternatively, for the 160 M, 80 M, or 40 M bandwidth, the maximum quantity of stations that are allowed to be scheduled is 12, and there is no limitation for another bandwidth.

2. When the DCM is not used for the HE-SIG-B, for the 160 M or 80 M bandwidth, the maximum quantity of stations that are allowed to be invoked is 28, and there is no limitation for another bandwidth.

It should be noted that the foregoing quantity of stations is corresponding to a quantity of user fields of the HE-SIG-B. In other words, the foregoing quantity of stations includes a quantity of dummy stations and a quantity of stations that actually participate in scheduling transmission.

Certainly, in an alternative solution, regardless of whether the DCM is used for the HE-SIG-B transmission, the solution may be directly performed according to the limitation 1. In other words, regardless of whether the DCM is used for transmission, for the 160 M or 80 M bandwidth, the maximum quantity of stations that are allowed to be invoked is 12, and for the 40 M bandwidth, the maximum quantity of stations that are allowed to be invoked is 14. Alternatively, for the 160 M, 80 M, or 40 M bandwidth, the maximum quantity of stations that are allowed to be scheduled is 12.

Embodiment 3

To resolve the foregoing technical problem, an embodiment of the present invention provides a method for efficiently indicating the end location (equivalent to obtaining the quantity of OFDM symbols) of the HE-SIG-B. On a transmitter side: a radio physical layer protocol data unit PPDU sending method includes the following steps.

301. A sending apparatus generates a radio physical layer protocol data unit PPDU, where the PPDU includes a high efficiency-signal field B HE-SIG-B, the HE-SIG-B includes a common field and a user specific field, and the user specific field includes one or more user fields. In addition, after the last user field, the HE-SIG-B includes information used to indicate that the HE-SIG-B ends.

302. Send the PPDU, so that a receiving apparatus determines an end position of the HE-SIG-B based on the information used to indicate that the HE-SIG-B ends.

In a specific example, the PPDU includes a high efficiency-signal field A, and the HE-SIG-A includes a field used to indicate a quantity of OFDM symbols of the HE-SIG-B. A specific value of the field used to indicate the quantity of the OFDM symbols of the HE-SIG-B is used to indicate: the HE-SIG-B includes the information used to indicate that the HE-SIG-B ends; and another value (any value other than the specific value) of the field used to indicate the quantity of OFDM symbols of the HE-SIG-B is used to indicate: the HE-SIG-B does not include the information used to indicate that the HE-SIG-B ends.

More specifically, a length of the information used to indicate that the HE-SIG-B ends is the same as a length of the user field. In an example, the information used to indicate that the HE-SIG-B ends starts with an 11-bit special station identifier AID, for example, 2044 or 2043. The quantity of symbols in the HE-SIG-B may be indicated by using another 10 bits, or several bits such as seven or eight bits, or all bits. In this case, when performing reception, a station needs to correctly decode only an HE-SIG-B content channel on which the station is located, and then knows the quantity of symbols in the HE-SIG-B. On a receiver side, correspondingly, a radio physical layer protocol data unit PPDU receiving method includes the following steps.

303. A receiving apparatus receives a radio physical layer protocol data unit PPDU, where the PPDU includes a high efficiency-signal field B HE-SIG-B, and the HE-SIG-B includes a common field common field and a user specific field user specific field, and the user specific field user specific field includes one or more user fields. In addition, after the last user field, the HE-SIG-B includes information used to indicate that the HE-SIG-B ends.

304. The receiving apparatus determines, based on at least the information used to indicate that the HE-SIG-B ends, an end position of the HE-SIG-B.

Specifically, the PPDU includes a high efficiency-signal field A, and the HE-SIG-A includes a field used to indicate a quantity of OFDM symbols in the HE-SIG-B, and the field used to indicate the quantity of OFDM symbols in the HE-SIG-B is a specific value or another value. The receiving apparatus reads, based on the specific value, the information used to indicate that the HE-SIG-B ends to determine the end position of the HE-SIG-B. Alternatively, the receiving apparatus determines, based on the quantity of OFDM symbols in the HE-SIG-B indicated by the another value, the end position of the HE-SIG-B.

As described in the method on the transmitter side, a length of the information used to indicate that the HE-SIG-B ends is the same as a length of the user field. In a specific example, the information used to indicate that the HE-SIG-B ends starts with an 11-bit-long special station identifier AID.

Embodiment 4

In another implementation, a radio physical layer protocol data unit PPDU sending method is provided, and the method includes the following steps.

401. A sending apparatus obtains a radio physical layer protocol data unit PPDU, where the PPDU includes a high efficiency-signal field A HE-SIG-A and a high efficiency-signal field B HE-SIG-B; and the HE-SIG-A includes a field (for example, a field B18-B21) used to indicate a quantity of OFDM symbols in the HE-SIG-B.

When different MCSs are used, or whether DCM (dual carrier modulation, dual carrier modulation) is used, or different bandwidths are used for HE-SIG-B field transmission, a same value in the field used to indicate the quantity of OFDM symbols in the HE-SIG-B indicates different quantities of OFDM symbols.

402. Send the PPDU is sent, so that a receiving apparatus determines, with reference to the different MCSs, whether the DCM is used, or the different bandwidth and based on the value of the field used to indicate the quantity of OFDM symbols of the HE-SIG-B, the quantity of OFDM symbols in the HE-SIG-B.

Specifically, the field used to indicate the quantity of OFDM symbols of the HE-SIG-B indicates different quantities of OFDM symbols according to different cases.

A quantity of symbols in the HE-SIG-B=ceil(the value of the field used to indicate the quantity of OFDM symbols in the HE-SIG-B+1)*coefficient factor, where the coefficient factor depends on the MCS used for the HE-SIG-B field transmission, whether the DCM is used for the HE-SIG-B field transmission, and the bandwidth used for the HE-SIG-B field transmission. The HE-SIG-A includes an indication indicating that the MCS is used for the HE-SIG-B field transmission, whether the DCM is used, and the bandwidth is used (for example, separately indicated by B1-B3, a B4, and B15-B17 bits in an HE-SIG-A 1 field).

On a receiver side, the method includes the following steps.

403. Receive a radio physical layer protocol data unit PPDU, where the PPDU includes a high efficiency-signal field A HE-SIG-A and a high efficiency-signal field B HE-SIG-B, and the HE-SIG-A includes a field (for example, a field B18-B21) used to indicate a quantity of OFDM symbols in the HE-SIG-B.

Specifically, the HE-SIG-A may further include one or a combination of the following information: an MCS used for the HE-SIG-B, whether DCM is used for the HE-SIG-B, or an operating bandwidth used for the HE-SIG-B.

404. A receiving apparatus determines, with reference to different MCSs, whether the DCM is used, or the operating bandwidth used for the HE-SIG-B and based on a value of the field used to indicate the quantity of OFDM symbols of the HE-SIG-B, the quantity of OFDM symbols in the HE-SIG-B.

Specific description is as follows: When an MCS0 and the DCM are used for HE-SIG-B field transmission, a quantity of data subcarriers (excluding pilot bits) included in each OFDM symbol is 13 bits.

When the MCS0 is used and no DCM is used for the HE-SIG-B field transmission, or when an MCS1 and the DCM are used, a quantity of data subcarriers (excluding pilot bits) included in each OFDM symbol is 26 bits.

When the MCS1 is used and no DCM is used for the HE-SIG-B field transmission, or when an MCS2 and the DCM are used, a quantity of data subcarriers (excluding pilot bits) included in each OFDM symbol is 52 bits.

Example 1: A bandwidth is 160 M (including two puncturing modes in the 160 M).

Based on Formula 1, for example, the current 160 M bandwidth is divided into a maximum of 74 resource units, and a quantity of information bits included in an HE-SIG-B content channel is 1010 bits, where N=4, a=1, and Z=37 in Formula 1.

Therefore, according to the quantity of data subcarriers included in each OFDM symbol in the foregoing cases in which the different MCSs are used and whether the DCM is used, the following may be obtained.

If the MCS0 and the DCM are used for the HE-SIG-B field transmission, 78 OFDM symbols in the HE-SIG-B are required.

If the MCS0 (no DCM), or the MCS1 and the DCM are used for the HE-SIG-B field transmission, 39 OFDM symbols in the HE-SIG-B are required.

If the MCS1 (no DCM), or the MCS2 and the DCM are used for the HE-SIG-B field transmission, 20 OFDM symbols in the HE-SIG-B are required.

In other cases, a required quantity of OFDM symbols in the HE-SIG-B is less than 16, and the required quantity is not limited by a length of the field (for example, the field B18-B21) that is in the HE-SIG-A 1 and that is used to indicate the quantity of OFDM symbols in the HE-SIG-B.

Based on the foregoing calculation, when the bandwidth is 160 M, and the MCS0 and the DCM are used for the HE-SIG-B field transmission, the coefficient factor is 4.875. To be specific, the quantity of OFDM symbols in the HE-SIG-B=ceil{(a value of the B18-B21+1)*4.875}. Specifically, a correspondence between the value of the B18-B21 in the HE-SIG-A 1 and the quantity of OFDM symbols in the HE-SIG-B indicated by the value of the B18-B21 is shown in the following Table 1.

TABLE 1

| Value of the B18-B21 in the HE-SIG-A 1 | Value obtained after multiplying the coefficient factor (the quantity of OFDM symbols in the HE-SIG-B) |
| --- | --- |
| 0 | 5 |
| 1 | 10 |
| 2 | 15 |
| 3 | 20 |
| 4 | 25 |
| 5 | 30 |
| 6 | 35 |
| 7 | 39 |
| 8 | 44 |
| 9 | 49 |
| 10 | 54 |
| 11 | 59 |
| 12 | 64 |
| 13 | 69 |
| 14 | 74 |
| 15 | 78 |

When the bandwidth is 160 M, the MCS is used and no DCM is used for the HE-SIG-B field transmission, or when the bandwidth is 160 M, the MCS1 and the DCM are used, the coefficient factor is 2.4375. To be specific, the quantity of symbols in the HE-SIG-B=ceil {(the value of the B18-B21+1)*2.4375}, and the foregoing correspondence is shown in the following Table 2.

TABLE 2

| Value of the B18-B21 in the HE-SIG-A 1 | Value obtained after multiplying the coefficient factor (the quantity of OFDM symbols in the HE-SIG-B) |
| --- | --- |
| 0 | 3 |
| 1 | 5 |
| 2 | 8 |

TABLE 2-continued

| Value of the B18-B21 in the HE-SIG-A 1 | Value obtained after multiplying the coefficient factor (the quantity of OFDM symbols in the HE-SIG-B) |
| --- | --- |
| 3 | 10 |
| 4 | 13 |
| 5 | 15 |
| 6 | 18 |
| 7 | 20 |
| 8 | 22 |
| 9 | 25 |
| 10 | 27 |
| 11 | 30 |
| 12 | 32 |
| 13 | 35 |
| 14 | 37 |
| 15 | 39 |

When the bandwidth is 160 M, the MCS1 is used and no DCM is used for the HE-SIG-B field transmission, or when the bandwidth is 160 M, the MCS2 and the DCM are used, the coefficient factor is 1.25. To be specific, the quantity of symbols in the HE-SIG-B=ceil {(the value of the B18-B21+1)*1.25}, and a specific correspondence is shown in the following Table 3.

TABLE 3

| Value of the B18-B21 in the HE-SIG-A 1 | Value obtained after multiplying the coefficient factor (the quantity of OFDM symbols in the HE-SIG-B) |
| --- | --- |
| 0 | 2 |
| 1 | 3 |
| 2 | 4 |
| 3 | 5 |
| 4 | 7 |
| 5 | 8 |
| 6 | 9 |
| 7 | 10 |
| 8 | 12 |
| 9 | 13 |
| 10 | 14 |
| 11 | 15 |
| 12 | 17 |
| 13 | 18 |
| 14 | 19 |
| 15 | 20 |

When the bandwidth is 160 M, and another rate is used for the HE-SIG field transmission (according to a case of the MCS and the DCM, or in other words, other than the foregoing cases), the coefficient factor is 1. In other words, in other cases, the value of the B18-B21 in the HE-SIG-A 1 is the same as the actual quantity of OFDM symbols in the HE-SIG-B indicated by the value of the B18-B2.

Example 2: A bandwidth is 80 M (including two puncturing modes in the 80 M).

Based on Formula 1, for example, the 80 M bandwidth is divided into a maximum of 37 resource units, and a quantity of information bits included in an HE-SIG-B content channel is 511, where N=2, a=1, and Z=18 in Formula 1.

Therefore, according to the quantity of data subcarriers included in each OFDM symbol in the foregoing cases in which the different MCSs are used and whether the DCM is used, the following may be obtained.

For the 80 M bandwidth, when the MCS0 and the DCM are used for the HE-SIG-B field transmission, 39 OFDM symbols in the HE-SIG-B are required. For the bandwidth 80 M, when the MCS0 is used for the HE-SIG-B field transmission without DCM, or the MCS1 and the DCM are used, 20 OFDM symbols in the HE-SIG-B are required. In other cases, the required quantity of symbols in the HE-SIG-B is less than 16, in other words, the quantity is less than a value indicated by the field that is in the HE-SIG-A 1 and that is used to indicate the quantity of symbols in the HE-SIG-B. Therefore, the required quantity is not limited.

Therefore, based on the foregoing calculation, when the bandwidth is 80 M, and the MCS0 and the DCM are used for the HE-SIG-B field transmission, the coefficient factor is 2.4375. To be specific, the quantity of symbols in the HE-SIG-B=ceil{(the value of the B18-B21+1)*2.3475}. Specifically, for a correspondence between the value of the B18-B21 in the HE-SIG-A 1 and the quantity of OFDM symbols in the HE-SIG-B indicated by the value of the B18-B21, refer to the foregoing Table 2.

When the MCS0 (no DCM), or the MCS1 and DCM are used for the HE-SIG-B field transmission, the coefficient factor is 1.25. To be specific, the quantity of symbols in the HE-SIG-B=ceil{(the value of the B18-B21+1)*1.25}, and a specific correspondence is shown in the foregoing Table 3.

When another rate is used for the HE-SIG field transmission (depending on the MCS and the DCM), the coefficient factor is 1. In other words, the value of the B18-B21 in the HE-SIG-A 1 is the same as the actual quantity of OFDM symbols in the HE-SIG-B indicated by the value of the B18-B2.

Example 3: A bandwidth is 40 M.

Based on Formula 1, for example, the maximum 40 M bandwidth is divided into a maximum of 18 resource units, and a quantity of information bits included in an HE-SIG-B content channel is 257, where N=1, a=0, and Z=9 in Formula 1. Therefore, when the MCS0 and the DCM are used for the HE-SIG-B field transmission, 20 symbols in the HE-SIG-B are required. In other cases, the required quantity of symbols in the HE-SIG-B is less than 16, and the required quantity is not limited by the HE-SIG-B symbol quantity field in the HE-SIG-A 1.

Therefore, based on the foregoing calculation, when the MCS0 and the DCM are used for the HE-SIG-B field transmission, the coefficient factor is 1.25. To be specific, the quantity of symbols in the HE-SIG-B=ceil{(the value of the B18-B21+1)*1.25}, and a specific correspondence is shown in Table 3.

When another rate is used for the HE-SIG field transmission (depending on the MCS and the DCM), the coefficient factor is 1. In other words, the value of the B18-B21 in the HE-SIG-A 1 is the same as the actual quantity of OFDM symbols in the HE-SIG-B indicated by the value of the B18-B2.

Example 4: A bandwidth is 20 M.

When any rate is used for the HE-SIG field transmission (depending on the MCS and the DCM), the coefficient factor is 1. In other words, when the bandwidth is 20 M, and the value of the B18-B21 in the HE-SIG-A 1 is the same as the actual quantity of OFDM symbols in the HE-SIG-B indicated by the value of the B18-B2.

Based on the foregoing four cases, in a specific implementation, the 802.11ax protocol specifies that the quantity of symbols in the HE-SIG-B=ceil(the value of the B18-B21 in the HE-SIG-A+1)*coefficient factor, and the coefficient factor depends on an MCS field, a DCM field, and a bandwidth field in the HE-SIG-A field. The coefficient factor is not limited to the foregoing values such as 4.875, 2.4375, and 1.25, provided that a maximum value obtained by multiplying the coefficient factor is greater than the required quantity of symbols in the HE-SIG-B. Certainly, if the maximum value is excessively large, there is excessive redundant symbols in the HE-SIG-B, and overheads are increased.

In another manner: the 802.11ax protocol specifies that the quantity of symbols in the HE-SIG-B=ceil(the value of the B18-B21 in the HE-SIG-A+1)*coefficient factor, and the coefficient factor depends on an MCS field and a DCM field in the HE-SIG-A field. The coefficient factor is subject to the coefficient factor specified when a maximum bandwidth is 160 M, and the 20 M bandwidth is an exception. When the bandwidth is 20 M, the coefficient factor is 1.

In another alternative implementation:

Based on the 802.11ax draft 2.0, a field M (namely, the B18-B21) that is in the HE-SIG-A 1 field and that is used to indicate the quantity of OFDM symbols in the HE-SIG-B and a field (a B22) used to indicate HE-SIG-B compression are used to jointly indicate the quantity of OFDM symbols in the HE-SIG-B.

Specifically, when the HE-SIG-B compression field B22=0, the quantity of symbols in the HE-SIG-B is equal to the value of the HE-SIG-B field (the B18-B21)+1. In this case, a minimum value is 1, and a maximum value is 16.

When the HE-SIG-B compression field B22=1, and the value of the HE-SIG-B field (the B18-B21)<=7, a quantity of MU-MIMO stations participating in a full bandwidth is equal to the value of the field M (the B18-B21)+1. When the HE-SIG-B compression field (the B22)=1, and the value of the field M (the B18-B21)>7, the quantity of OFDM symbols in the HE-SIG-B is equal to the value of the HE-SIG-B field B18-B21+1+8. In this case, a minimum value is 17 and a maximum value is 24. In conclusion, the HE-SIG-B symbol field B18-B21 and the HE-SIG-B compression field B22 in the HE-SIG-A 1 field jointly indicate that a quantity of symbols in the HE-SIG-B ranges from 1 to 24.

In a specific example, the foregoing indicated value may be applicable only to: another transmission rate for the HE-SIG-B other than the following cases: the MCS0 and the DCM are used for the HE-SIG-B, or another rate other than the MCS0 (no DCM), or the MCS1 and the DCM are used for the HE-SIG-B. Certainly, the value may also be applicable to all transmission rates.

In another example, for the foregoing three cases: the MCS0 and the DCM are used for the HE-SIG-B, or the MCS0 (no DCM) is used for the HE-SIG-B, or the MCS1 and the DCM are used for the HE-SIG-B, the three cases includes the following cases.

As mentioned above, based on the 802.11ax draft 2.0, the HE-SIG-B MCS field in the HE-SIG-A 1 field (B1-B3) is used to indicate an MCS used for the HE-SIG-B. Values 0 to 5 of the B1-B3 respectively indicate MCSs 0 to 5 used for the HE-SIG-B. In addition, values 6 and 7 of the B1-B3 are reserved bits.

Specifically, when the value of the B1-B3 is 0, the value indicates that the MCS0 is used for the HE-SIG-B, and in this case, the quantity of symbols in the HE-SIG-B is a value jointly indicated by the HE-SIG-A 1 field B18-B21 and the HE-SIG-B compression field (B22). In this case, a minimum value is 1, and a maximum value is 24.

When the value of B1-B3 is 6, the value indicates that the MCS0 is used for the HE-SIG-B symbol, and in this case, the quantity of symbols in the HE-SIG-B is the value jointly indicated by the HE-SIG-A 1 field (B18-B21) and the HE-SIG-B compression field (B22)+24. In this case, a minimum value is 25, and a maximum value is 48.

When the value of DCM field (B4) in the HE-SIG-A 1 field is 1, it indicates that the DCM is used for the HE-SIG-B. In the following three cases, a value obtained after the value jointly indicated by the HE-SIG-A 1 field B18-B21 and the HE-SIG-B compression field B22 is multiplied by the coefficient factor 2 is used to indicate the quantity of symbols in the HE-SIG-B. Otherwise, the jointly indicated value is the indicated quantity of symbols in the HE-SIG-B, or is multiplied by the coefficient factor 1. The following specific cases are included.

When the value of B1-B3 is 0 and B4=1, it indicates that the MCS0 and the DCM are used for the HE-SIG-B symbol, and in this case, the quantity of symbols in the HE-SIG-B is (the value jointly indicated by the HE-SIG-A 1 field B18-B21 and the HE-SIG-B compression field B22)*2. In this case, a minimum value is 2, and a maximum value is 48.

When the value of B1-B3 is 6, and B4=1, it indicates that the MCS0 and the DCM are used for the HE-SIG-B symbol, and in this case, the quantity of symbols in the HE-SIG-B is (the value jointly indicated by the HE-SIG-A 1 field B18-B21 and the HE-SIG-B compression field B22+24)*2. In this case, a minimum value is 50, and a maximum value is 96.

When the value of B1-B3 is 1, and B4=1, it indicates that the MCS1 and the DCM are used for the HE-SIG-B symbol, and in this case, the quantity of symbols in the HE-SIG-B is (the value jointly indicated by the HE-SIG-A 1 field B18-B21 and the HE-SIG-B compression field B22)*2. In this case, a minimum value is 2, and a maximum value is 48.

In another alternative implementation:

Based on the 802.11ax draft 2.0, the HE-SIG-B MCS field in the HE-SIG-A 1 field (B1-B3) is used to indicate an MCS used for the HE-SIG-B. Values 0 to 5 of the B1-B3 respectively indicate MCSs 0 to 5 used for the HE-SIG-B. In addition, values 6 and 7 of the B1-B3 are reserved bits.

When the value of the B1-B3 is 0, the value indicates that the MCS0 is used for the HE-SIG-B symbol, and in this case, the quantity of symbols in the HE-SIG-B is a value of the HE-SIG-A 1 field B18-B21+1. In this case, a minimum value is 1, and a maximum value is 16.

When the value of the B1-B3 is 6, the value indicates that the MCS0 is used for the HE-SIG-B symbol, and in this case, the quantity of symbols in the HE-SIG-B is a value of the HE-SIG-A 1 field B18-B21+1+16. In this case, a minimum value is 17, and a maximum value is 32.

When the value of the B1-B3 is 7, the value indicates that the MCS0 is used for the HE-SIG-B symbol, and in this case, the quantity of symbols in the HE-SIG-B is a value of the HE-SIG-A 1 field B18-B21+1+32+16. In this case, a minimum value is 33, and a maximum value is 48.

When the DCM field B4 in the HE-SIG-A 1 field is 1, it indicates that the DCM is used for the HE-SIG-B, and in the foregoing three cases, the quantity of symbols (independently) indicated by the B18-B21 in the HE-SIG-A 1 field is multiplied by the coefficient factor 2. Otherwise, the quantity remains unchanged or the quantity is multiplied by the coefficient factor 1, and this specifically includes the following cases.

When the value of the B1-B3 is 0, and B4=1, it indicates that the MCS0 is used for the HE-SIG-B symbol, and in this case, the quantity of symbols in the HE-SIG-B is (the value of the B18-B21 in the HE-SIG-A 1 field+1)*2. In this case, a minimum value is 2, and a maximum value is 32.

When the value of the B1-B3 is 6, and B4=1, it indicates that the MCS0 is used for the HE-SIG-B symbol, and in this case, the quantity of symbols in the HE-SIG-B is (the value of the B18-B21 in the HE-SIG-A 1 field+1+16)*2. In this case, a minimum value is 34, and a maximum value is 64.

When the value of the B1-B3 is 7, and B4=1, it indicates that the MCS0 is used for the HE-SIG-B symbol, and in this case, the quantity of symbols in the HE-SIG-B is (the value of the B18-B21 in the HE-SIG-A 1 field+1+32)*2. In this case, a minimum value is 66, and a maximum value is 96.

Another implementation of the present invention provides an apparatus that can implement one of the foregoing methods. Optionally, a sending apparatus 500 is an AP or a chip on an AP, and a receiving apparatus 600 is a terminal or a chip on a terminal.

The embodiments of the present invention can be applied to various communications devices.

Figure 5:
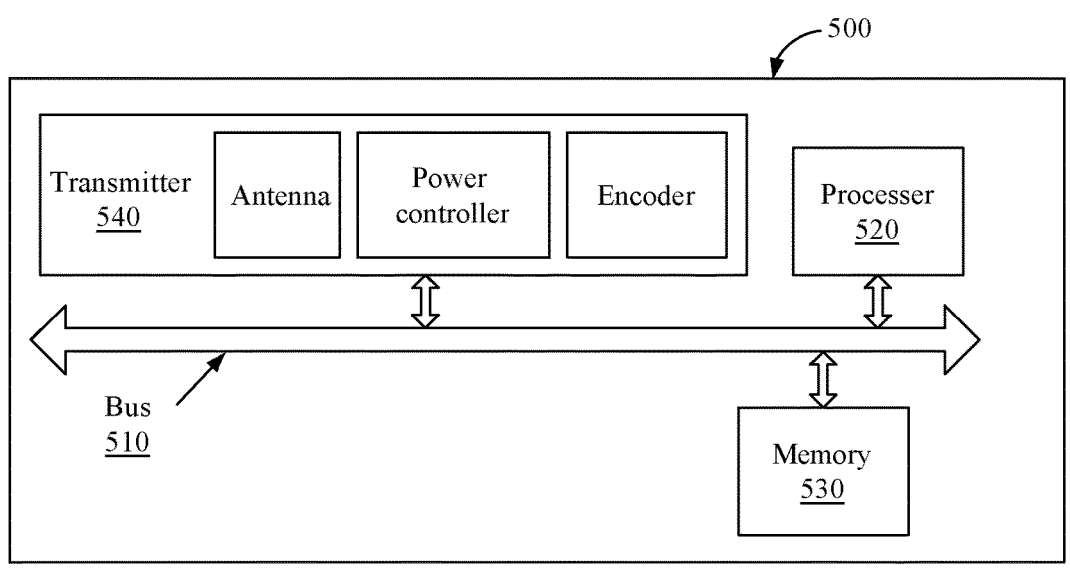
FIG. 5 is a simple schematic structural diagram of a sending apparatus.

Referring to FIG. 5, a transmitter of the sending apparatus 500 may include a transmitting circuit, a power controller, an encoder, and an antenna. In addition, the device 500 may further include a receiver. The receiver may include a receiving circuit, a power controller, a decoder, and an antenna.

A processor may also be referred to as a CPU. A memory may include a read-only memory and a random access memory, and provide an instruction and data to the processor. A part of the memory may further include a non-volatile random access memory (NVRAM). In a specific application, the device 500 may be built in or the device 500 may be a wireless communications device such as a network device, and may further include a carrier including a transmitting circuit and a receiving circuit, to allow data transmission and reception between the device 500 and a remote location. The transmitting circuit and the receiving circuit may be coupled into an antenna. Components of the device 500 are coupled together by using a bus, and the bus further includes a power supply bus, a control bus, and a status signal bus in addition to a data bus. Certainly, the bus may be another replaced connection circuit. However, for clarity of description, various buses are marked as the bus in the figure. In different specific products, the decoder may be integrated with a processing unit.

The processor can implement or execute the steps and the logical block diagrams that are disclosed in the method embodiments of the present invention. A general-purpose processor may be a microprocessor, or the processor may be any conventional processor, decoder, or the like. The steps in the method disclosed with reference to the embodiments of the present invention may be directly performed by a hardware processor, or may be performed by using a combination of hardware and a software module in a decoding processor. The software module may be located in a mature storage medium in the art, such as a random access memory, a flash memory, a read-only memory, a programmable read-only memory, an electrically erasable programmable memory, or a register.

It should be understood that in the embodiments of the present invention, the processor may be a central processing unit ("CPU" for short), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor, or the like.

The memory may include a read-only memory and a random access memory, and provide an instruction and data to the processor. A part of the memory may further include a non-volatile random access memory. For example, the memory may further store information about a device type.

A bus system may further include a power bus, a control bus, a status signal bus, and the like, in addition to a data bus.

However, for clarity of description, various buses are marked as the bus system in the figure.

In an implementation process, steps in the foregoing methods can be implemented by using an integrated logic circuit of hardware in the processor, or by using instructions in a software form. The steps in the method disclosed with reference to the embodiments of the present invention may be directly performed by a hardware processor, or may be performed by using a combination of hardware and a software module in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and implements the steps in the foregoing methods in combination with hardware of the processor. To avoid repetition, details are not described herein again.

The sending apparatus 500 according to this embodiment of the present invention may be corresponding to a transmit end in the method in the embodiments of the present invention (for example, the AP). In addition, all units, namely, modules, of the sending apparatus 500 and the foregoing and other operations and/or functions are separately intended to implement corresponding procedures of the implementations. For brevity, details are not described herein.

Figure 6:
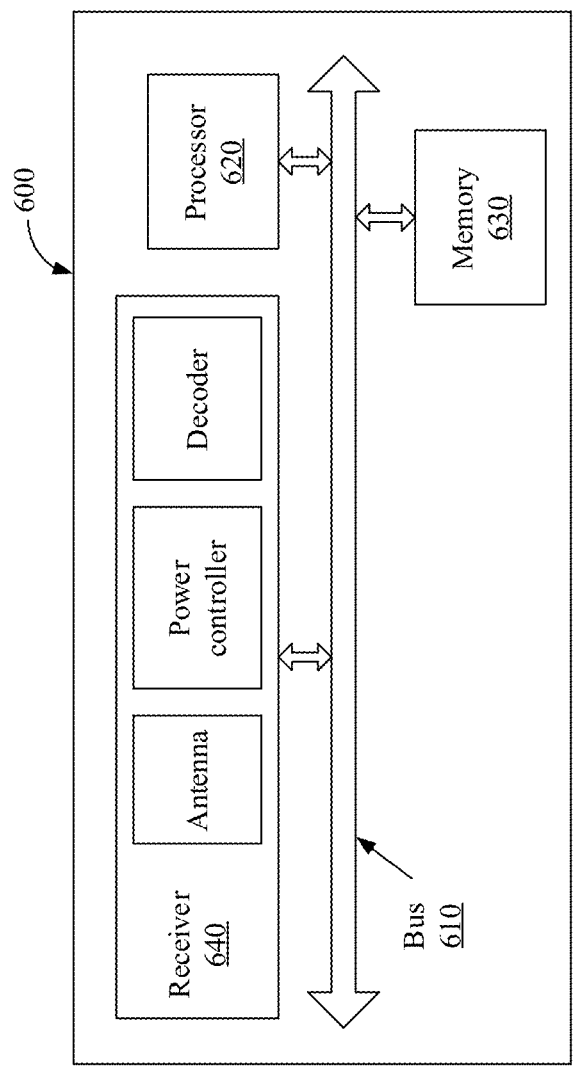
FIG. 6 is a simple schematic structural diagram of a receiving apparatus.

FIG. 6 is a schematic block diagram of a receiving apparatus 600 according to an embodiment of the present invention. The receiving apparatus 600 is applied to a wireless local area network, and the apparatus 600 includes:

a bus 610, where the bus 610 may certainly be another replaced connection circuit;

a processor 620 connected to the bus;

a memory 630 connected to the bus; and a receiver 640 connected to the bus.

The processor invokes a program stored in the memory by using the bus, to use the program for the method mentioned in the foregoing implementations, and details are not described herein again.

Optionally, a transmit end is a network device, and the device 600 is a terminal device.

The embodiments of the present invention can be applied to various communications devices.

A receiver of the device 600 may include a receiving circuit, a power controller, a decoder, and an antenna, and the device 600 may further include a transmitter, and the transmitter may include a transmitting circuit, a power controller, an encoder, and an antenna.

The processor may also be referred to as a CPU. The memory may include a read-only memory and a random access memory, and provide an instruction and data to the processor. A part of the memory may further include a non-volatile random access memory (NVRAM). In a specific application, the device 600 may be built in or the device 600 may be a wireless communications device such as a terminal device, and may further include a carrier including a transmitting circuit and a receiving circuit, to allow data transmission and reception between the device 600 and a remote location. The transmitting circuit and the receiving circuit may be coupled into an antenna. Components of the device 600 are coupled together by using a bus, and the bus further includes a power supply bus, a control bus, and a status signal bus in addition to a data bus. However, for clarity of description, various buses are marked as the bus in the figure. In different specific products, the decoder may be integrated with a processing unit.

The processor can implement or execute the steps and the logical block diagrams that are disclosed in the method embodiments of the present invention. A general-purpose processor may be a microprocessor, or the processor may be any conventional processor, decoder, or the like. The steps in the method disclosed with reference to the embodiments of the present invention may be directly performed by a hardware processor, or may be performed by using a combination of hardware and a software module in a decoding processor. The software module may be located in a mature storage medium in the art, such as a random access memory, a flash memory, a read-only memory, a programmable read-only memory, an electrically erasable programmable memory, or a register.

It should be understood that in the embodiments of the present invention, the processor may be a central processing unit ("CPU" for short), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor, or the like.

The memory may include a read-only memory and a random access memory, and provide an instruction and data to the processor. A part of the memory may further include a non-volatile random access memory. For example, the memory may further store information about a device type.

A bus system may further include a power bus, a control bus, a status signal bus, and the like, in addition to a data bus. However, for clarity of description, various buses are marked as the bus system in the figure.

In an implementation process, steps in the foregoing methods can be implemented by using an integrated logic circuit of hardware in the processor, or by using instructions in a software form. The steps in the method disclosed with reference to the embodiments of the present invention may be directly performed by a hardware processor, or may be performed by using a combination of hardware and a software module in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and implements the steps in the foregoing methods in combination with hardware of the processor. To avoid repetition, details are not described herein again.

The apparatus 600 according to this embodiment of the present invention may be corresponding to a receive end in the method in the embodiments of the present invention (for example, the terminal device). In addition, all units, namely, modules, of the sending apparatus 500 and the foregoing and other operations and/or functions are separately intended to implement corresponding procedures of the foregoing implementations. For brevity, details are not described herein.

It should be understood that sequence numbers of the foregoing processes do not mean execution sequences in the embodiments of the present invention. The execution sequences of the processes should be determined based on functions and internal logic of the processes, and should not be construed as any limitation on the implementation processes of the embodiments of the present invention.

A person of ordinary skill in the art may be aware that, the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present invention.

It may be clearly understood by a person skilled in the art that for the purpose of convenient and brief description, for a detailed working process of the described system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, function units in the embodiments of the present invention may be integrated into one processing unit, or each of the units may exist alone physically, or two or more units are integrated into one unit.

When functions are implemented in the form of a software function unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a transmit end, or the like) to perform all or some of the steps of the methods in the embodiments of the present invention. The foregoing storage medium includes various media that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention should be subject to the protection scope of the claims.

The invention claimed is:

1. A radio physical layer protocol data unit (PPDU) sending method, comprising:
   obtaining a radio physical layer protocol data unit (PPDU), wherein the PPDU includes a high efficiency-signal field A (HE-SIG-A) and a high efficiency-signal field B (HE-SIG-B), and wherein the HE-SIG-A includes a field that indicates a quantity of OFDM symbols in the HE-SIG-B, wherein
   a specific value of the field in the HE-SIG-A field indicates that the quantity of OFDM symbols in the HE-SIG-B field is greater than or equal to 16, and the quantity is determined by a field in the HE-SIG-B field; and
   sending the PPDU.

2. The method according to claim 1, wherein the field in the HE-SIG-A is B18-B21.

3. The method according to claim 1, wherein the specific value of the field in the HE-SIG-A field is 15.

4. The method according to claim 1, wherein other value of the field in the HE-SIG-A field is any one of 0 to 14, and the other value of the field in the HE-SIG-A field indicates the quantity of OFDM symbols in the HE-SIG-B field is equal to the other value plus 1.

5. The method according to claim 1, wherein
   the HE-SIG-A field further includes a B22; and at least one of the following occurs:
      when a value of the B22 is 0, the field in the HE-SIG-A field indicates the quantity of OFDM symbols in the HE-SIG-B field, or
      when a value of the B22 is 1, the field in the HE-SIG-A field indicates a quantity of stations participating in multi-user multiple-input multiple-output transmission.

6. The method according to claim 1, the field in the HE-SIG-B is a common field in the HE-SIG-B.

7. A radio physical layer protocol data unit (PPDU) receiving method, comprising:
   receiving a radio physical layer protocol data unit (PPDU), wherein the PPDU includes a high efficiency-signal field A (HE-SIG-A) and a high efficiency-signal field B (HE-SIG-B), and wherein the HE-SIG-A includes a field that indicates a quantity of OFDM symbols in the HE-SIG-B, wherein
   a specific value of the field in the HE-SIG-A field indicates that the quantity of OFDM symbols in the HE-SIG-B field is greater than or equal to 16, and the quantity is determined by a field in the HE-SIG-B field; and
   determining, based on the received PPDU, the quantity of OFDM symbols in the HE-SIG-B or an end position of the HE-SIG-B field.

8. The method according to claim 7, wherein the field in the HE-SIG-A is B18-B21.

9. The method according to claim 7, wherein the specific value of the field in the HE-SIG-A field is 15.

10. The method according to claim 7, wherein other value of the field in the HE-SIG-A field is any one of 0 to 14, and the other value of the field in the HE-SIG-A field indicates the quantity of OFDM symbols in the HE-SIG-B field is equal to the other value plus 1.

11. The method according to claim 7, wherein
the HE-SIG-A field further includes a B22; and at least one of the following occurs:
when a value of the B22 is 0, the field in the HE-SIG-A field indicates a quantity of OFDM symbols in the HE-SIG-B field, or
when a value of the B22 is 1, the field in the HE-SIG-A field indicates a quantity of stations participating in multi-user multiple-input multiple-output transmission.

12. The method according to claim 7, the field in the HE-SIG-B is a common field in the HE-SIG-B.

13. A radio physical layer protocol data unit (PPDU) sending apparatus, comprising:
at least one processor; and
one or more memories coupled to the at least one processor and storing programming instructions for execution by the at least one processor to:
obtain a PPDU, wherein the PPDU includes a high efficiency-signal field A (HE-SIG-A) and a high efficiency-signal field B (HE-SIG-B), and wherein the HE-SIG-A includes a field that indicates a quantity of OFDM symbols in the HE-SIG-B, wherein
a specific value of the field in the HE-SIG-A field indicates that the quantity of OFDM symbols in the HE-SIG-B field is greater than or equal to 16, and the quantity is determined by a field in the HE-SIG-B field; and
send the PPDU.

14. The apparatus according to claim 13, wherein the field in the HE-SIG-A is B18-B21.

15. The apparatus according to claim 13, wherein the specific value of the field in the RE-SIG-A field is 15.

16. The apparatus according to claim 13, wherein other value of the field in the HE-SIG-A field is any one of 0 to 14, and the other value of the field in the HE-SIG-A field indicates the quantity of OFDM symbols in the HE-SIG-B field is equal to the other value plus 1.

17. The apparatus according to claim 13, wherein
the HE-SIG-A field further includes a B22; and at least one of the following occurs:
when a value of the B22 is 0, the field in the HE-SIG-A field indicates the quantity of OFDM symbols in the HE-SIG-B field, or
when a value of the B22 is 1, the field in the HE-SIG-A field indicates a quantity of stations participating in multi-user multiple-input multiple-output transmission.

18. The apparatus according to claim 13, the field in the HE-SIG-B is a common field in the HE-SIG-B.

19. A radio physical layer protocol data unit (PPDU) receiving apparatus, comprising:
at least one processor; and
one or more memories coupled to the at least one processor and storing programming instructions for execution by the at least one processor to: receive a radio physical layer protocol data unit (PPDU), wherein the PPDU includes a high efficiency-signal field A (HE-SIG-A) and a high efficiency-signal field B (HE-SIG-B), and wherein the HE-SIG-A includes a field that indicates a quantity of OFDM symbols in the HE-SIG-B, wherein
a specific value of the field in the HE-SIG-A field indicates that the quantity of OFDM symbols in the HE-SIG-B field is greater than or equal to 16, and the quantity is determined by a field in the HE-SIG-B field; and
determining, based on the received PPDU, the quantity of OFDM symbols in the HE-SIG-B or an end position of the HE-SIG-B field.

20. The apparatus according to claim 19, wherein the field in the HE-SIG-A is B18-B21.

21. The apparatus according to claim 19, wherein the specific value of the field in the RE-SIG-A field is 15.

22. The apparatus according to claim 19, wherein other value of the field in the HE-SIG-A field is any one of 0 to 14, and the other value of the field in the HE-SIG-A field indicates the quantity of OFDM symbols in the HE-SIG-B field is equal to the other value plus 1.

23. The apparatus according to claim 19, wherein
the HE-SIG-A field further includes a B22; and at least one of the following occurs:
when a value of the B22 is 0, the field in the HE-SIG-A field indicates a quantity of OFDM symbols in the HE-SIG-B field, or
when a value of the B22 is 1, the field in the HE-SIG-A field indicates a quantity of stations participating in multi-user multiple-input multiple-output transmission.

24. The apparatus according to claim 19, the field in the HE-SIG-B is a common field in the HE-SIG-B.

* * * * *

UNITED STATES PATENT AND TRADEMARK OFFICE
CERTIFICATE OF CORRECTION

PATENT NO. : 11,582,008 B2
APPLICATION NO. : 17/696427
DATED : February 14, 2023
INVENTOR(S) : Ming Gan et al.

Page 1 of 1

It is certified that error appears in the above-identified patent and that said Letters Patent is hereby corrected as shown below:

In the Claims

In Column 23, In Line 31, In Claim 15, delete "RE-SIG-A" and insert -- HE-SIG-A --.

In Column 24, In Line 27, In Claim 21, delete "RE-SIG-A" and insert -- HE-SIG-A --.

Signed and Sealed this
Thirtieth Day of May, 2023

Katherine Kelly Vidal
*Director of the United States Patent and Trademark Office*